US005967177A

United States Patent [19]

Bueser

[11] Patent Number: 5,967,177

[45] Date of Patent: Oct. 19, 1999

[54] PRESSURE REGULATING VALVE

[75] Inventor: Wolfgang Bueser, Freiberg, Germany

[73] Assignee: Robert Bosch GmbH, Stuttgart, Germany

[21] Appl. No.: 08/894,624

[22] PCT Filed: Jul. 26, 1996

[86] PCT No.: PCT/DE96/01394

§ 371 Date: Aug. 22, 1997

§ 102(e) Date: Aug. 22, 1997

[87] PCT Pub. No.: WO97/23741

PCT Pub. Date: Jul. 3, 1997

[30] Foreign Application Priority Data

Dec. 29, 1995 [DE] Germany ........................... 195 48 167

[51] Int. Cl.[6] ........................................ G05D 16/08

[52] U.S. Cl. ........................... 137/510; 137/459; 137/463

[58] Field of Search ............................ 137/510; 123/459, 123/463

[56] References Cited

U.S. PATENT DOCUMENTS

| | | | |
|---|---|---|---|
| 4,936,342 | 6/1990 | Kojima et al. | 137/510 |
| 5,076,320 | 12/1991 | Robinson | 137/510 |
| 5,220,941 | 6/1993 | Tuckey | 137/510 |

FOREIGN PATENT DOCUMENTS 2173883 10/1986 United Kingdom .

*Primary Examiner*—Stephen M. Hepperle
*Attorney, Agent, or Firm*—Edwin E. Greigg; Ronald E. Greigg

[57] ABSTRACT

A fuel pressure regulating valve for motor vehicles which decreases, the noise behavior of pressure regulating valves frequently found to be annoying. The pressure regulating valve includes a sealing gap, a first part, and a second part of a connection opening which are dimensioned so that the noise behavior of the pressure regulating valve is significantly better than that of known pressure regulating valves. The pressure regulating valve is particularly suited for fuel delivery systems of motor vehicles with an internal combustion engine.

18 Claims, 3 Drawing Sheets

PRESSURE REGULATING VALVE

PRIOR ART

The invention is based on a pressure regulating for a fuel delivery system of an internal combustion engine.

Usually a pressure regulating valve is used to regulate the pressure in a fuel delivery system of an internal combustion engine. The pressure regulating valve is disposed on the pressure side of the fuel pump. A portion of the fuel delivered by the fuel pump is supplied to the engine via injection valves. In many engines, each cylinder is provided with an injection valve. It is necessary that at every moment, the injection valves are injecting the precisely correct fuel quantity, wherein the permissible scatter between the injection valves is extremely small. The excess quantity of fuel not required by the engine is returned to the fuel reservoir via the pressure regulating valve. In so doing, the pressure regulating valve regulates the pressure on the pressure side of the fuel pump. In different motor vehicles, components that influence the return pressure are inserted in the return line that leads from the pressure regulating valve to the fuel reservoir. The components can, for example, be a jet pump and/or a control valve.

In order to make a motor vehicle with an internal combustion engine as quiet as possible, the endeavor is made to minimize the noise produced by the pressure regulating valve, which in the past could not be achieved at a justifiable cost. In particular, components present in the return line that influence the return pressure have a considerable negative influence on the noise behavior of the pressure regulating valve. Another disadvantage of the known pressure regulating valves is that vibrations are produced in the fuel, which in the injection valves have a negative effect on a uniform distribution of the fuel.

In order to improve the noise behavior of the pressure regulating valve and in order to prevent the impairing influence of vibrations on the fuel metering of the injection valves, a number of embodiments of different pressure regulating valves have been tested. In the course of the tests, the length of the sealing gap between the closing body of the pressure regulating valve and the valve seat was varied in different pressure regulating valves, but this did not make it possible to eliminate the negative noise behavior of the pressure regulating valve. In another measurement series, for example, the diameter of the connection opening that adjoins the sealing gap was varied. This, too, did not allow any satisfactory improvement of the noise behavior to be achieved. By enlarging the diameter of the connection opening, noise stemming from high-turbulence flows could in fact be slightly reduced, but in turn, the reactions coming from the return line, via the pressure regulating valve, and back onto the pressure side were so strong that it was clear that this would not lead to the achievement of a satisfactory solution. In particular if there were fluctuating through flows and components in the return line that influenced the pressure (e.g. jet pumps), then in order to keep the reactions onto the pressure side of the pressure regulating valve within limits, the diameter of the connection opening could not be great enough that the noise stemming from high-turbulence flows could have been prevented. In another series of tests, the through flow of fuel was throttled by a throttle downstream of the sealing gap. However, in order to achieve a noticeable reduction of noise, the throttle had to be chosen so small that the pressure regulating valve was given throttling characteristics and was no longer suitable for regulating a pressure. It was therefore clear that the installation of a throttle downstream of the sealing gap could not be considered for purposes of noise reduction. In addition, pressure regulating valves were also tested in which the closing body of the pressure regulating valve is provided with a friction element that provides a friction between the valve housing and the closing body when the sealing gap is opened and closed. The noise behavior could be noticeably improved with this pressure regulating valve, but the regulating behavior of this embodiment is very insufficient and is encumbered with relatively high hysteresis. Moreover, the cost of producing this pressure regulating valve with the friction element is connected with a very high expense and is therefore not an acceptable possibility for solving the noise problem.

ADVANTAGES OF THE INVENTION

The pressure regulating valve according to the invention has the advantage over the prior art that the noise emanating from the pressure regulating valve is sharply reduced and that the manufacturing costs of the pressure regulating valve are low. Reactions coming from the return line via the pressure regulating valve and back onto the pressure on the pressure side are advantageously prevented to as great an extent as possible. Using the pressure regulating valve according to the invention in injection valves advantageously produces a precise, uninterrupted fuel metering and a uniform fuel distribution between the injection valves.

Advantageous improvements and updates of the pressure regulating valve set forth herein are possible through the measures taken in producing the device.

If the pressure regulating valve is embodied as set forth hereinafter, it is assured that the noise behavior is distinctly better than in a known pressure regulating valve. If the pressure regulating valve is produced in accordance with the limiting measures set forth, then the noise behavior as a whole can be further improved. Normal through flows in a pressure regulating valve for a fuel delivery system of an internal combustion engine are disposed in a range of from 10 to 180 liters per hour. In the pressure regulating valve according to the invention, the noise reduction is in particular produced in the range of these through flows.

BRIEF DESCRIPTION OF THE DRAWINGS

Selected, particularly advantageous exemplary embodiments of the invention are shown in simplified form in the drawings and are explained in detail in the ensuing specification.

DESCRIPTION OF THE EXEMPLARY EMBODIMENTS

The pressure regulating valve according to the invention can preferably be used in internal combustion engines in which a fuel pressure in the fuel delivery system is intended to be regulated.

Figure 1:
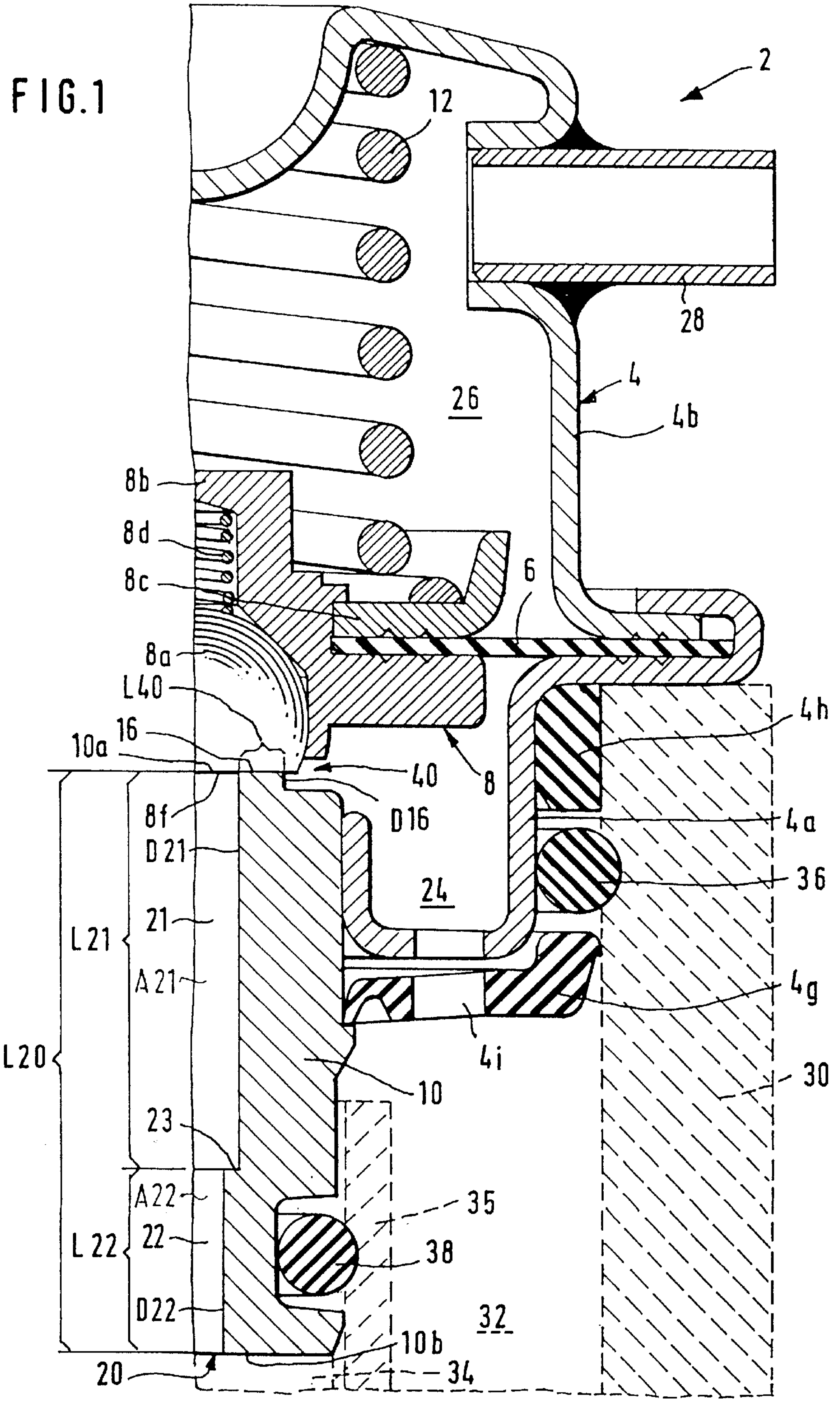
FIGS. 1 to 3 show details from different exemplary embodiments.

In a first exemplary embodiment, FIG. 1 shows a half section along a symmetry axis through an especially advantageous pressure regulating valve 2, which has been particularly selected for the specification and is embodied by way of example.

The pressure regulating valve 2 selected by way of example is an embodiment that is essentially rotationally symmetrical. In order to be able to represent the details in as large a fashion as possible without taking up too much space, the sectional plane, which is selected for the drawing and passes through the pressure regulating valve 2, is only represented on one side of the symmetry axis.

The pressure regulating valve 2 includes a valve housing 4, a membrane 6, a closing body 8, a connection fitting 10, and a closing spring 12. The valve housing 4 is composed of a bottom housing part 4*a* and a top housing part 4*b*. The membrane 6 is clamped along its circumference between the bottom housing part 4*a* and the top housing part 4*b*.

The closing body 8 includes, for example, a flattened face ball 8*a,* a securing element 8*b,* a spring plate 8*c,* and a spring 8*d.* The membrane 6 has a central recess and on the circumference of this recess, is clamped in the closing body 8 between the securing element 8*b* and the spring plate 8*c*. There is a smooth face 8*f* on the ball 8*a.*

The connection fitting 10 has a first end face 10*a* oriented toward the closing body 8, on which a valve seat 16 is disposed, and has an end face 10*b* remote from the closing body 8. A connection opening 20 passes through the connection fitting 10. The connection opening 20 leads from the first end face 10*a* to the second end face 10*b*.

The connection opening 20 is divided into a first part 21 and a second part 22. The first part 21 has a length L21, and the second part 22 has a length L22. The first part 21 has a diameter D21 and the second part 22 has a diameter D22. Of the two diameters D21 and D22, the diameter D21 of the first part 21 is the larger diameter and the diameter D22 of the second part 22 is the smaller diameter. Between the two parts 21 and 22, there is a step 23 that can also have rounded parts or can be embodied extending in the shape of a cone. The length L21 and the length L22 in series produce a total length L20. The larger diameter D21 is affiliated with a larger cross sectional area A21. The smaller diameter D22 is affiliated with a smaller cross sectional area A22. The diameter and cross sectional area remain in a fixed relationship to each other in accordance with known geometrical rules of calculation.

The membrane 6 divides a fuel chamber 24 from a valve chamber 26. Via a connection 28 and via a line, not shown, the valve chamber 26 communicates, for example, with an intake tube, not shown, of the internal combustion engine.

The pressure regulating valve 2 is installed in a fuel distributor 30. For the sake of better visibility, the fuel distributor 30 is represented with dashed lines. There is a bore that serves as a pressure line 32 in the fuel distributor 30. A sleeve insert 35 in the bore in the fuel distributor 30 constitutes a beginning of a return line 34. An electrically driven fuel pump, not shown, delivers fuel from a fuel reservoir into the pressure line 32. Fuel not needed by the engine flows from the pressure line 32 through the pressure regulating valve 2 to the return line 34 and from there to the fuel reservoir, not shown.

Components that influence the return pressure of the fuel in the return line 34, for example a jet pump or a number of jet pumps and/or a valve, can be provided in the course of the return line 34, preferably in the region of the fuel reservoir. The fuel pump does in fact deliver a relatively constant fuel quantity, but since the fuel quantity taken in by the engine can fluctuate considerably, the through flow passing through the pressure regulating valve 2 fluctuates considerably. The fuel flowing through the pressure regulating valve 2 fluctuates, for example, between 10 and 180 liters per hour. The pressure regulating valve 2 embodied according to the invention is suited for keeping the pressure of the fuel in the pressure line 32 at a constant value, almost independently of how great the through flow passing through the pressure regulating valve 2 is. So that the pressure in the pressure line 32 remains constant, it is important that even with a large through flow, no throttling of any consequence is exerted on the fuel by the pressure regulating valve 2. The pressure regulating valve 2 embodied according to the invention is preferably embodied so that in the event of a through flow of more than 180 liters per hour, no inadmissible throttling of the fuel occurs.

The bottom housing part 4*a* of the valve housing 4 is provided with a ring 4*h* and with a ring 4*g* that facilitates the installation of the pressure regulating valve 2 in the fuel distributor 30. A seal 36 between the two rings 4*g,* 4*h* seals the pressure line 32 in the fuel distributor 30 toward the outside. An annular recess is provided on the outer circumference of the connection fitting 10. A seal 38 in the annular recess divides the return line 34 from the pressure line 32.

The pressure line 32 is connected to the fuel chamber 24 via a through opening 4*i* that leads through the ring 4*g* and the bottom housing part 4*a.* The force of the closing spring 12 and the hydraulically acting pressure surfaces of the closing body 8 and the membrane 6 are matched to one another so that via the pressure chamber 24, the desired pressure prevails in the pressure line 32.

The valve seat 16 has an outer diameter D16. The valve seat 16 extends on the end face 10*a* as a circular, annular surface around the first part 21 of the connection opening 20 between the diameter D21 and the outer diameter D16. Depending mainly on the pressure in the fuel chamber 24, the face 8*f* of the closing body 8 rests on the valve seat 16 or the closing body 8 lifts up more or less slightly from the connection fitting 10. Depending on the level of the pressure in the fuel chamber 24, there is a greater or lesser sealing gap 40 between the valve seat 16 on the connection fitting 10 and the face 8*f* on the closing body 8. The sealing gap 40 extends concentrically around the connection opening 20. The sealing gap 40 begins at the outer diameter D16 and ends at the diameter D21. Between the outer diameter D16 and the diameter D21, the sealing gap 40 has an effective sealing gap length L40.

For noise reduction in the pressure regulating valve 2, various measurements of the pressure regulating valve 2 must be embodied in a particular ratio to one another: the greater cross sectional area A21 is 1.65 times to 3.33 times as great as the smaller cross sectional area A22. In other words, the ratio of the smaller cross sectional area A22 to the larger cross sectional area A21 is 1:1.65 to 1:3.33. And the length L22 of the second part 22 can be embodied as up to 5.83 times as great as the effective sealing gap length L40. In other words, the sealing gap length L40 must be embodied as at least so long that the length L22 of the second part 22 is at most 5.83 times as great as the sealing gap length L40.

That is, A22:A21=1:1.65 to 1:3.33 and L40:L22=1:<5.83 to 1:5.83.

If the two parts 21 and 22 of the connection opening 20 have circular cross sections, then the indicated values for the ratio of the cross sectional areas A21 and A22 to each other are used to calculate the values of the diameters to each other as follows: the greater diameter D21 is 1.29 times to 1.72 times greater than the smaller diameter D22. In other words, the ratio of the smaller diameter D22 to the larger diameter D21 is 1:1.29 to 1:1.82.

That is, D22:D21=1:1.29 to 1:1.82.

The indicated values of the diameters to each other apply for circular cross sectional areas. The cross sectional area A21 and/or the cross sectional area A22 can also be oval, for example. With cross sectional areas that diverge from the circular, the corresponding dimensions change with the same above-mentioned ratio of the two cross sectional areas A21 and A22 to each other.

The above-mentioned ratios between the cross sectional areas or the diameters as well as the ratios of corresponding lengths to one another produce an improvement to the pressure regulating valve 2 in relation to other pressure regulating valves. Depending on the intended use and depending on customer requirements with regard to noise behavior, the ratios mentioned must be narrowed. The following description includes further details with regard to this.

In order to obtain the mentioned ratios in the dimensions, which correspond to the invention, it is proposed that the pressure regulating valve 2 be preferably embodied with the following dimensions: the diameter D21 of the first part 21 of the connection opening 20 should be between 2.7 mm and 3.1 mm, the diameter D22 of the second part should be between 1.7 mm and 2.1 mm, the sealing gap length L40 of the sealing gap 40 should be at least 1.2 mm and the length L22 of the second part 22 of the connection opening 20 should be between 4.0 mm and 7.0 mm.

With the values indicated, the pressure regulating valve 2 is significantly quieter than previously known pressure regulating valves and at the same time, the pressure regulating valve 2 is excellently suited for the through flow between 10 and 180 liters per hour, which exists in conventional internal combustion engines, at a regulated pressure difference of for example 3 bar. The pressure difference can also have a different value. Preferably, the pressure difference is between 2.5 bar and 4.5 bar. If the indicated values are maintained, then in addition, no impermissible throttling of the through flow occurs. The indicated limit values are included as possible values.

It should be further emphasized that the effective sealing gap length L40 of the sealing gap 40 should not be chosen as markedly longer than 1.6 mm because an enlargement of the sealing gap length L40 beyond 1.6 mm does not bring a noise behavior change of any consequence, but signifies an enlargement of the area of the valve seat 16 and the face **8*f* of the closing body 8 and therefore an enlargement of the entire pressure regulating valve 2. Therefore, it is proposed that the effective sealing gap length L40 of the sealing gap 40 be selected between 1.2 mm and preferably 1.6 mm. It turns out from this that the ratio of the sealing gap length L40 to the length L22 of the second part 22 should preferably be between 1:2.5 and 1:583. In other words, the length L22 is 2.50 times to 5.83 times as long as the sealing gap length L40**.

That is, L40:L22=1:2.50 to 1:583.

It is advantageous for noise reduction and particularly suitable to embody the ratio of the total length L20, which is comprised of the length L21 plus the length L22, to the length 22 as 2.0:1 to 5.5:1. In other words, the total length L20 is 2.0 times to 5.5 times as long as the length L22.

That is, L22:L20=1:2.0 to 1:5.5. With the length L22 of 4.0 mm to 7.0 mm mentioned, the total length L20 should therefore be embodied as preferably between 14 mm and 22 mm.

If the pressure regulating valve 2 is embodied so that the dimensions lie within the above-indicated limit values, then a significant improvement of the noise behavior of the pressure regulating valve 2 is attained in comparison to pressure regulating valves whose dimensions lie outside these limit values. With dimensions within these limit values, no impermissible throttling of the through flow and no unacceptable size of the pressure regulating valve 2 have to be accepted. Also, the required construction expense is low.

If the above-mentioned limit values are narrowed somewhat, then a significant additional improvement of the pressure regulating valve 2 is achieved, in particular with regard to the noise behavior. The significant improvement mentioned is achieved if the dimensions of the pressure regulating valve 2 are narrowed to the following limit values. The diameter D21 of the first part between 2.8 mm and 3.0 mm; the diameter D22 of the second part 22 between 1.8 mm and 2.0 mm; the sealing gap length L40 of the sealing gap 40 between 1.3 mm and 1.5 mm; the length L22 of the second part 22 between 4.5 mm and 6.0 mm; the total length L20 between 15 mm and 18 mm. This means the following ratios of the dimensions:

A22:A21=1:1.96 to 1:2.78

D22:D21=1:1.40 to 1:1.67

L40:L22=1:3.00 to 1:4.62

L22:L20=1:2.50 to 1:4.00.

A further improvement of the mentioned properties of the pressure regulating valve 2 is produced when the indicated dimensions are limited as indicated below and the diameter D21 of the first part 21 is embodied in the range of approximately 2.9 mm, the diameter D22 of the second part 22 is chosen in the range of approximately 1.9 mm, the sealing gap length L40 of the sealing gap 40 is embodied as approximately 1.35 mm long, the length L22 of the second part 22 is selected as approx. 5.0 mm to 5.5 mm long, and the pressure regulating valve 2 is embodied so that the total length L20 of the two parts 21, 22 together is between 16 mm and 17 mm long. It is proposed that the pressure regulating valve 2 be preferably embodied with the latter mentioned dimensions, wherein normal manufacture conditional tolerance deviations of the dimensions have no negative effects on the noise behavior. In this preferred, particularly favorable advantageous embodiment, the dimensions have the following ratios to one another:

A22:A21=1:2.33

D22:D21=1:1.53

L40:L22=1:3.89

L22:L20=1:3.14.

An at least partial improvement is also produced if one of the indicated dimensions or a number of the indicated dimensions is given a tighter tolerance in the indicated manner.

Figure 2:
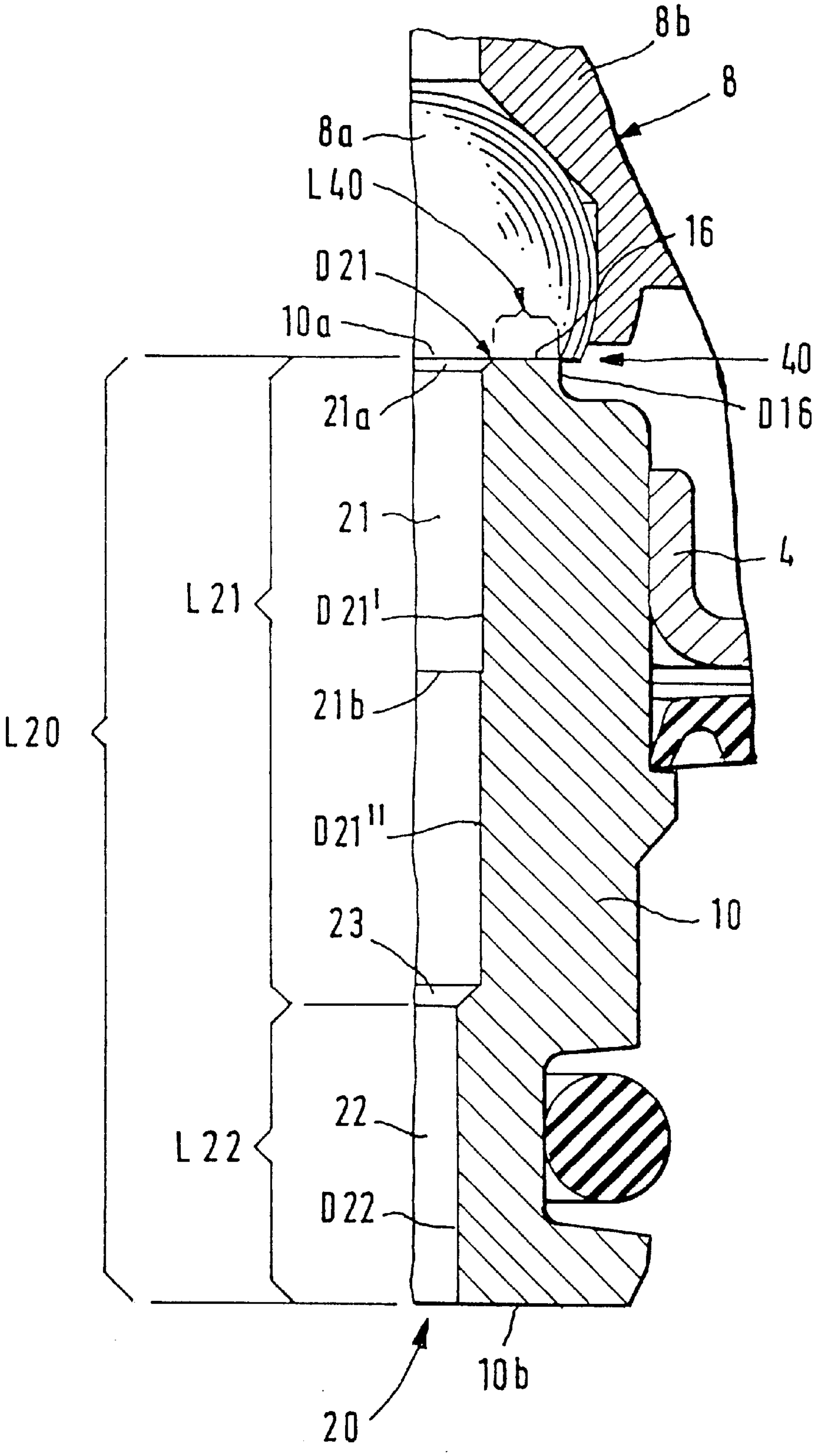

FIG. 2 shows another especially chosen, advantageous exemplary embodiment, wherein for the sake of better visibility, different areas of the pressure regulating valve 2 are not represented.

In all Figs., the same parts or parts that function in the same manner are given the same reference numerals. As long as nothing contrary is mentioned or represented in the drawings, then that which is mentioned and represented in conjunction with one of the Figs. also applies to the other exemplary embodiments. As long as nothing different ensues from the explanations, the details of the different exemplary embodiments can be combined with one another.

In the exemplary embodiment represented in FIG. 2, the first part 21 of the connection opening 20 is provided with a bevel **21*a*. The sealing gap 40 ends at the transition between the bevel 21*a* and the valve seat 16. This transition defines the effective diameter D21 of the first part 21 of the connection opening 20. After the bevel 21*a*, the first part 21 has a diameter D21', which is slightly smaller than the effective diameter D21. In order to obtain an optimal improvement of the noise behavior of the pressure regulating valve 2**, the bevel should not be wider than 0.2 mm. This means that considered from the direction of the end face 10*a*, the diameter D21' that adjoins the bevel 21*a* should not be more than 0.4 mm smaller than the diameter D21.

It is sometimes difficult to precisely embody a longer cylindrical bore with a relatively small diameter. Therefore in the exemplary embodiment represented in FIG. 2, a step 21*b* is provided approximately in the middle of the length L21 of the first part 21 of the connection opening 20. At the step 21*b*, the diameter of the first part 21 changes slightly. Considered starting from the valve seat 16, the diameter D21' is adjoined at the step 21*b* by a diameter D21". The diameter D21" downstream of the step 21*b* is at most 0.1 mm smaller than the diameter D21' upstream of the step 21*b*.

The step 23 that determines the transition between the two parts 21 and 22 can, as represented in FIG. 1, be embodied in the form of a shoulder that runs perpendicular to the connection opening 20. However, it is also possible to embody the step 23 in the shape of a cone, as represented in the exemplary embodiment represented in FIG. 2. The conical nature of the step 23 is preferably determined as a function of which angle is the most suitable for the bit required to manufacture the connection opening 20.

Figure 3:
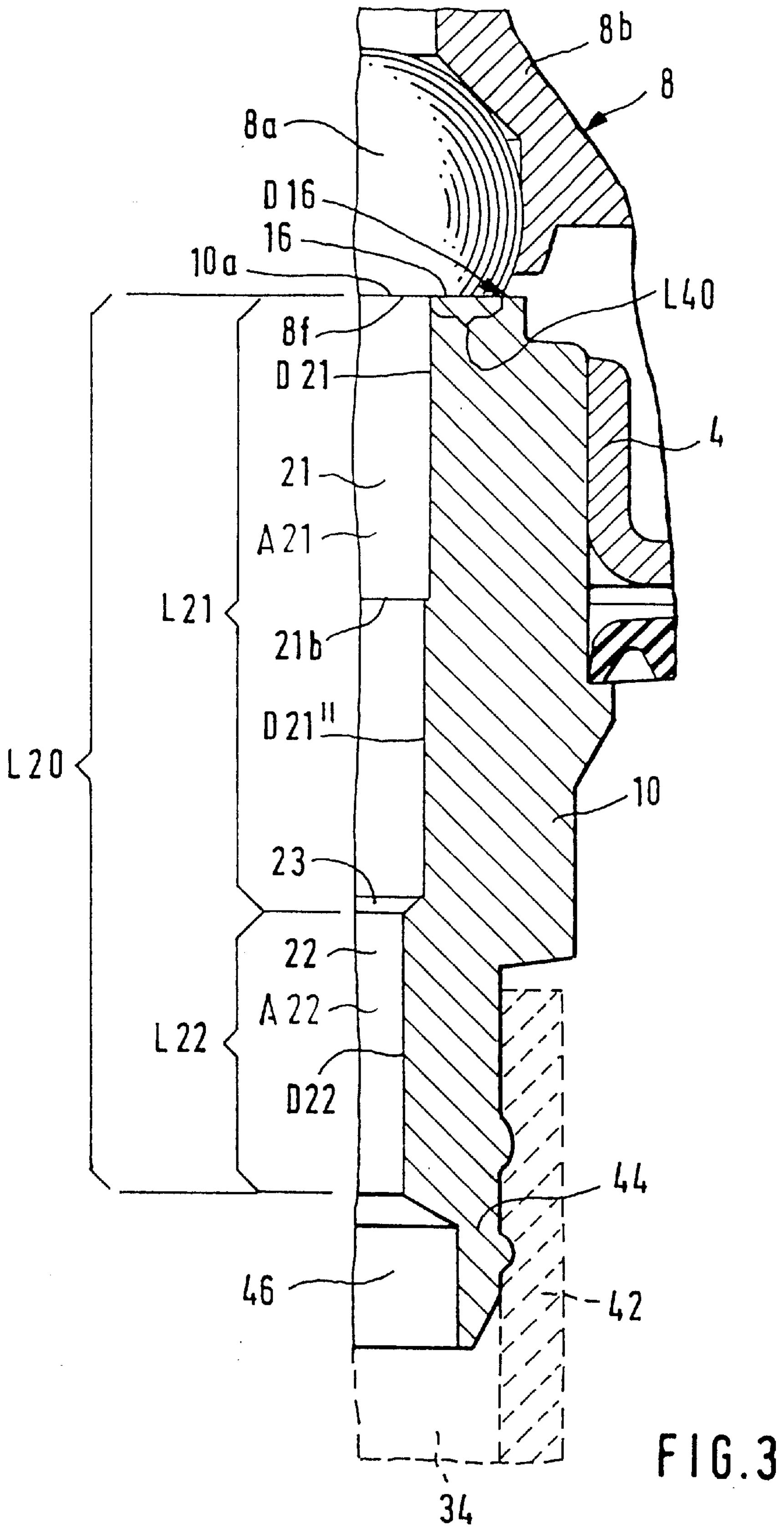

FIG. 3 shows a detail of another selected, particularly advantageous exemplary embodiment.

In the exemplary embodiment represented in FIG. 1, the fuel distributor 30 is comprised of a dimensionally stable material, preferably metal, and the pressure line 32 and the return line 34 are provided in the fuel distributor 30. The pressure regulating valve 2 is slid, together with the bottom housing part 4*a* and the connection fitting 10, into the fuel distributor 30 and is sealed as described previously. In contrast to this, FIG. 3 shows an exemplary embodiment in which the return line 34 extends in an elastic hose line 42. For better clarity, the hose line 42 is represented in FIG. 3 with dashed lines. An elongation 44 is provided on the connection fitting 10 for the purpose of a more reliable connection between the hose line 42 and the connection fitting 10. In the-exemplary embodiment represented in FIG. 3, an additional part 46 adjoins the second part 22, considered from the direction of the valve seat 16. The diameter of the additional part 46 is significantly greater than the diameter D22 of the second part 22. The diameter of the additional part 46 is so large that practically no throttling of the through flow takes place in the region of the additional part 46. The transition between the second part 22 and the additional part 46 can take place, as represented in FIG. 3, via a conical step. The transition, though, can also be carried out via a step that runs perpendicular to the connection opening 20.

In contrast to the exemplary embodiments represented in FIGS. 1 and 2, in the exemplary embodiment shown in FIG. 3, the ball 8*a* of the closing body 8 is dimensioned slightly smaller in relation to the outer diameter of the connection fitting 10. In the exemplary embodiment represented in FIG. 3, the effective outer diameter D16 is disposed on the outer circumference of the face 8*f* of the closing body 8, where the face 8*f* cuts the ball-shape of the ball 8*a*. The sealing gap 40 with the sealing gap length L40 begins at the outer diameter D16 and ends at the diameter D21.

In the exemplary embodiment represented in FIG. 3, the bevel 21*a* represented in FIG. 2 is eliminated. In FIG. 3, the first part 21 between the end face 10*a* and the step 21*b* continuously has the effective cylindrical diameter D21. At the step 21*b*, the diameter D21 is followed by the diameter D21", which is at most 0.1 mm smaller.

In the exemplary embodiments represented, the closing body 8 includes the ball 8*a* that rests against the connection fitting 10. It should be emphasized that in lieu of the ball 8*a*, for example a plate can also be provided, which is connected to the closing body 8 directly or via a ball supported in the securing element 8*b* and is supported in the closed state against the valve seat 16 of the connection fitting 10. Another embodiment of the pressure regulating valve 2 can also, for example, have the appearance that in the ball 8*a*, the face 8*f* is eliminated. In this modified embodiment, the ball 8*a* that is supported on the connection fitting 10 has no flattening and the valve seat 16 on the connection fitting 10 is correspondingly adapted for this purpose. That is, the valve seat 16 on the connection fitting 10 is for example conical or spherical. Also with this embodiment, the described optimal reduction of the noise behavior of the pressure regulating valve 2 is produced if the sealing gap between the closing body 8 and the connection fitting 10 has the length described in conjunction with the exemplary embodiments represented and also the other limit values are maintained.

The foregoing relates to preferred exemplary embodiments of the invention, it being understood that other variants and embodiments thereof are possible within the spirit and scope of the invention, the latter being defined by the appended claims.

The invention claimed and desired to be secured by Letters Patent of the United States is:

1. A pressure regulating valve for fuel delivery systems of internal combustion engines, comprising a valve housing, a membrane clamped in the valve housing, said membrane divides a fuel chamber from a valve chamber in the valve housing, and is provided with a connection fitting (10), a connection opening (20) is provided in the connection fitting and a valve seat is provided on the connection fitting and extends around the connection opening, a closing body (8) is connected to the membrane and is acted upon by a closing force in a direction counter to the valve seat, between the closing body and the connection fitting, a circumferential sealing gap (40) is provided, said sealing gap divides the fuel chamber from the connection opening (20) in a pressure dependent manner, starting from the valve seat (16), the connection opening (20) has a greater cross sectional area (A21) in a first part (21) than a smaller cross sectional area (A22) in a second part (22), wherein a ratio of the smaller cross sectional area (A22) to the larger cross sectional area (A21) is 1:1.65 to 1:3.33 and the second part (22) has a length (L22), which is up to 5.83 times as great as an effective sealing gap length (L40) of the sealing gap (40).

2. A pressure regulating valve according to claim 1, in which the first part (21) has a diameter (D21) that is 1.29 times to 1.82 times as great as a diameter (D22) of the second part (22).

3. A pressure regulating valve according to claim 2, in which the diameter (D21) of the first part (21) is between 2.7 mm and 3.1 mm.

4. A pressure regulating valve according to claim 2, in which the diameter (D21) of the first part (21) is between 2.8 mm and 3.0 mm.

5. A pressure regulating valve according to claim 2, in which the diameter (D21) of the first part (21) is approximately 2.9 mm.

6. A pressure regulating valve according to claim 2 in which the diameter (D22) of the second part (22) is between 1.7 mm and 2.1 mm.

7. A pressure regulating valve according to claim 2, in which the diameter (D22) of the second part (22) is between 1.8 mm and 2.0 mm.

8. A pressure regulating valve according to claim 2, in which the diameter (D22) of the second part (22) is approximately 1.9 mm.

9. A pressure regulating valve according to claim 1, in which the sealing gap length (L40) of the sealing gap (40) is at least 1.2 mm.

10. A pressure regulating valve according to claim 1, in which the sealing gap length (L40) is between 1.2 mm and 1.6 mm.

11. A pressure regulating valve according to claim 1, in which the sealing gap length (L40) is approximately 1.35 mm.

12. A pressure regulating valve according to claim 1, in which the length (L22) of the second part (22) is between 4.0 mm and 7.0 mm.

13. A pressure regulating valve according to claim 1, in which the length (L22) of the second part (22) is between 4.5 mm and 6.0 mm.

14. A pressure regulating valve according to claim 1, in which the length (L22) of the second part (22) is approximately 5.0 mm to 5.5 mm.

15. A pressure regulating valve according to claim 1, in which the first part (21) and the second part (22) together have a total length (L20), wherein the total length (L20) is 2 times to 5.5 times as long as the second part (22).

16. A pressure regulating valve according to claim 15, in in which the total length (L20) of the first part (21) and of the second part (22) is between 14 mm and 22 mm.

17. A pressure regulating valve according to claim 15, in which the total length (L20) of the first part (21) and of the second part (22) is between 15 mm and 18 mm.

18. A pressure regulating valve according to claim 17, in which the total length (L20) of the first part (21) and of the second part (22) together is approximately 16 mm to 17 mm.

* * * * *